United States Patent
Huber et al.

(10) Patent No.: US 12,395,072 B2
(45) Date of Patent: Aug. 19, 2025

(54) FLYING CAPACITOR MULTI-LEVEL POWER FACTOR CORRECTION CONVERTER OF POWER SUPPLY WITH ACTIVE BALANCING OF VOLTAGE OF FLYING CAPACITORS

(71) Applicant: Delta Electronics, Inc., Taipei (TW)

(72) Inventors: Laszlo Huber, Cary, NC (US); Peter Mantovanelli Barbosa, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 280 days.

(21) Appl. No.: 18/089,815

(22) Filed: Dec. 28, 2022

(65) Prior Publication Data

US 2024/0223074 A1 Jul. 4, 2024

(51) Int. Cl.
*H02M 1/42* (2007.01)
*H02M 7/217* (2006.01)

(52) U.S. Cl.
CPC ....... *H02M 1/4225* (2013.01); *H02M 1/4216* (2013.01); *H02M 7/217* (2013.01)

(58) Field of Classification Search
CPC ... H02M 1/4225; H02M 1/4216; H02M 7/217
See application file for complete search history.

(56) References Cited

U.S. PATENT DOCUMENTS

| | | | |
|---|---|---|---|
| 9,325,252 B2 | 4/2016 | Narimani et al. | |
| 10,536,073 B2 | 1/2020 | Young et al. | |
| 2017/0237339 A1* | 8/2017 | Young | H02M 1/38 363/126 |
| 2022/0045618 A1 | 2/2022 | Kumar et al. | |
| 2022/0060183 A1* | 2/2022 | Yao | H02M 1/08 |

(Continued)

FOREIGN PATENT DOCUMENTS

| | | |
|---|---|---|
| CN | 115995985 A | 4/2023 |
| TW | 202205794 A | 2/2022 |

OTHER PUBLICATIONS

Barbosa et al., Active neutral-point-clamped (ANPC) multilevel converter technology. IEEE European Conf. on Power Electronics and Applications, 2005, pp. 1-10.

(Continued)

*Primary Examiner* — Jue Zhang
*Assistant Examiner* — Lakaisha Jackson
(74) *Attorney, Agent, or Firm* — Wolf, Greenfield & Sacks, P.C.

(57) ABSTRACT

A power factor correction (PFC) converter includes an inductor to electrically connect to an alternating current (AC) source, a first set of switches to be electrically connected to a terminal of the inductor at one end and to a negative output terminal at an opposite end, and a second set of switches to be electrically connected to the terminal of the inductor at one end and to a positive output terminal at an opposite end. An output voltage of the PFC converter is between the positive output terminal and the negative output terminal. Two or more flying capacitors are connected between different pairs of adjacent ones of the first set of switches and corresponding adjacent ones of the second set of switches. A controller controls duty cycle of the first set of switches and the second set of switches based on balancing voltages of the two or more flying capacitors.

20 Claims, 6 Drawing Sheets

(56) References Cited

U.S. PATENT DOCUMENTS

2022/0321016 A1    10/2022    Khaligh et al.
2022/0393589 A1*   12/2022    Maksimovic ........... H02M 1/08
2023/0155514 A1    5/2023    Saha et al.
2023/0412090 A1*   12/2023    Abdelhamid ....... H02M 1/0025

OTHER PUBLICATIONS

Debnath et al., Operation, control, and applications of the modular multilevel converter: a review. IEEE Trans. on Power Electronics, Jan. 2015;30(1):37-53.

Du et al., Classical Control of Modular Multilevel Converter. IEEE.2018. 24 pages.

Escalante et al., Estimation of the capacitor voltages in flying capacitor multi-level converters. IET Power Electronics. Oct. 5, 2020;651-665.

Feng et al., Modified phase-shifted PWM Control for Flying Capacitor Multilevel Converters. IEEE Trans. on Power Electronics. Jan. 2007;22(1):178-185.

Holmes et al., Space Vector PWM for Multilevel Converters. Pulse width modulation for power converters, Principles and practice, John Wiley & Sons, Inc., Hoboken, New Jersey, 2003.

Khazraei et al. A generalized capacitor voltage balancing scheme for flying capacitor multilevel converters. IEEE Applied Power Electronics Conf (APEC).2010.58-62.

Ma et al. Dual-loop High Speed Voltage Balancing Control for High Frequency Four-level GaN Totem-Pole PFC Using Small Flying Capacitors. IEEE Energy Conversions Conf. and Expo (ECCE). 2020.6218-6225.

Qin et al. A High-Power-Density Power Factor Correction Front End Based on Seven-Level Flying Capacitor Multilevel Converter. IEEE Journal of Emerging and Selected Topis in Power Electronics. Sep. 2019;7(3):1883-1898.

Sepahvand et al., Start-Up Procedure and Switching Loss Reduction for a Single-Phase Flying Capacitor Active Rectifier. IEEE Trans. on Ind. Electronics.Sep. 2013;60(9):3699-371.

Vu et al. Feasibility study of compact high-efficiency bidirectional 3-level bridgeless totem-pole PFC/inverter at low cost. Proc. IEEE Applied Power Electronics Conf. (APEC). 2020. pp. 3397-3404.

Taiwan Office Action dated Aug. 20, 2024, in connection with Taiwan Application No. 112151129.

Extended European Seach Report dated Nov. 4, 2024, in connection with European Application No. 24179842.0.

Kumar et al., Isolated Three-Port Bidirectional DC-DC Converter for Electric Vehicle Applications. IEEE Applied Power Electronics Conference and Exposition (APEC). Mar. 20, 2022. pp. 2000-2007.

Mukherjee et al., a High Power Density Wide Range DC-DC Converter for Universal Electric Vehicle Charging. IEEE Transactions on Power Electronics. Feb. 2023;38(2):1998-2012.

Twiname et al., A New Resonant Bidirectional DC-DC Converter Topology. IEEE Transactions on Power Electronics. Sep. 2014;29(9):4733-40.

* cited by examiner

FLYING CAPACITOR MULTI-LEVEL POWER FACTOR CORRECTION CONVERTER OF POWER SUPPLY WITH ACTIVE BALANCING OF VOLTAGE OF FLYING CAPACITORS

BACKGROUND

This invention relates to power factor correction (PFC) in a power supply and, more particularly, to a flying capacitor multi-level (FCML) PFC converter in a power supply with active balancing of the voltage of each of the flying capacitors.

A power supply generally obtains alternating current (AC) supplied by the grid, for example, and rectifies the AC input to provide direct current (DC) needed by a load. Power factor refers to the ratio of real power delivered to a load to apparent power in the power supply system. The closer that current and voltage are in phase to each other, the closer the power factor is to 1 and the higher the efficiency of the power supply system. Power factor correction refers to making the line current follow the shape of the line voltage. A PFC converter implements the power factor correction and also the rectifier function.

SUMMARY

According to one or more embodiments, a power factor correction (PFC) converter includes an inductor to electrically connect to an alternating current (AC) source, a first set of switches, including three or more switches arranged in series, configured to be electrically connected to a terminal of the inductor at one end and to a negative output terminal at an opposite end, and a second set of switches, including three or more switches arranged in series, configured to be electrically connected to the terminal of the inductor at one end and to a positive output terminal at an opposite end. An output voltage of the PFC converter is between the positive output terminal and the negative output terminal. Two or more flying capacitors are each connected between different pairs of adjacent ones of the first set of switches and corresponding adjacent ones of the second set of switches. A controller controls a duty cycle of the first set of switches and the second set of switches based on balancing voltages of the two or more flying capacitors.

According to one or more embodiments, a power supply includes a power factor correction (PFC) converter. The PFC converter includes an inductor to electrically connect to an alternating current (AC) source, a first set of switches, including three or more switches arranged in series, configured to be electrically connected to a terminal of the inductor at one end and to a negative output terminal at an opposite end, and a second set of switches, including three or more switches arranged in series, configured to be electrically connected to the terminal of the inductor at one end and to a positive output terminal at an opposite end. An output voltage of the PFC converter is between the positive output terminal and the negative output terminal. Two or more flying capacitors are each connected between different pairs of adjacent ones of the first set of switches and corresponding adjacent ones of the second set of switches. A controller controls a duty cycle of the first set of switches and the second set of switches based on balancing voltages of the two or more flying capacitors. The power supply also includes a direct current (DC)-DC converter to modify the output voltage prior to supplying a load of the power supply.

According to another embodiment, a method of assembling a power factor correction (PFC) converter includes arranging an inductor to electrically connect to an alternating current (AC) source, arranging a first set of switches, including three or more switches, in series, wherein the first set of switches is electrically connected to a terminal of the inductor at one end and to a negative output terminal at an opposite end, and arranging a second set of switches, including three or more switches, in series. The second set of switches is electrically connected to the terminal of the inductor at one end and to a positive output terminal at an opposite end, and an output voltage of the PFC converter is between the positive output terminal and the negative output terminal. The method also includes arranging two or more flying capacitors such that each of the two or more flying capacitors is connected between different pairs of adjacent ones of the first set of switches and corresponding adjacent ones of the second set of switches, and configuring a controller to control a duty cycle of the first set of switches and the second set of switches based on balancing voltages of the two or more flying capacitors.

The foregoing has outlined some of the pertinent features of the disclosed subject matter. These features are merely illustrative.

BRIEF DESCRIPTION OF THE DRAWINGS

The examples described throughout the present document will be better understood with reference to the following drawings and descriptions. In the figures, like-referenced numerals designate corresponding parts throughout the different views.

DETAILED DESCRIPTION

Reference will now be made to the drawings to describe the present disclosure in detail. It will be understood that the drawings and exemplified embodiments are not limited to the details thereof. Modifications may be made without departing from the spirit and scope of the disclosed subject matter.

A power supply may be implemented in two stages, with a front-end PFC converter followed by a DC-DC converter. The PFC converter may be implemented with a multi-level topology for both high efficiency and the high power density required by many applications. A data center is an example of an application exhibiting the need for high efficiency and high power density. The PFC converter may have a flying-capacitor multi-level (FCML) topology, where so-called flying capacitors are high frequency capacitors and multi-level refers to a totem-pole arrangement of switches. The duty cycle of the switches is conventionally controlled to perform power factor correction (i.e., to make the line current follow the shape of the line voltage), as well as to regulate the output voltage.

The FCML arrangement may facilitate the use of lower voltage rated switches that have lower parasitic capacitances and, thus, decreased switching losses than their higher voltage counterparts. However, as the number of levels increases to four or more, the number of flying capacitors increases to two or more. When there is more than one flying capacitor, it can be more challenging to balance the voltage of the flying capacitors for proper operation of the FCML PFC converter. Natural charge balance cannot be guaranteed under transient conditions and larger unbalanced conditions. Natural balancing is also a slow process with poor dynamic response. Another approach, passive balancing (e.g., with the inclusion of Zener clamps), increases the cost and volume of the converter while introducing additional power losses. Prior active balancing considered only one flying capacitor or involved generating a lookup table offline to indicate the proper switching states to balance flying capacitor voltage.

In some situations, the need for dynamic active balancing of the voltage of two or more flying capacitors is appreciated. Embodiments detailed herein relate to active balancing of the voltage of each of the flying capacitors in FCML PFC converters. The duty cycle of the multi-level switches may be adjusted based on an error voltage (i.e., a difference between a reference (desired) voltage and a sensed (actual) voltage) of associated one or more flying capacitors. The adjustment refers to the fact that the conventional power factor correction-based control of the duty cycle of the switches is modified based on the active balancing of the voltage of each of the flying capacitors. Each flying capacitor is associated with a respective balancing controller. From a center of the totem-pole, an equal number of upper and lower switches extends from the inside of the totem-pole to the outside. The flying capacitors, too, may be thought of as extending from the inside (associated with switches that are closer to the center of the totem-pole) to the outside (associated with switches that are farther from the center of the totem-pole).

As detailed, the duty cycle of the two innermost switches, closest to the center of the totem-pole, is adjusted by the balancing controller of the innermost flying capacitor such that the adjustment signal is negatively proportional to the error voltage of the innermost flying capacitor. The duty cycle of the two outermost switches, farthest from the center of the totem-pole, is adjusted by the balancing controller of the outermost flying capacitor such that the adjustment signal is positively proportional to the error voltage of the outermost flying capacitor. The two innermost switches and the two outermost switches are each connected to only one flying capacitor. The duty cycle of the intermediate switches, which are connected between two flying capacitors, is adjusted by the balancing controllers of the corresponding (two) flying capacitors such that the adjustment signal is positively proportional to the error voltage of the flying capacitor that is closer to the innermost flying capacitor and negatively proportional to the error voltage of the flying capacitor that is closer to the outermost flying capacitor.

Figure 1:
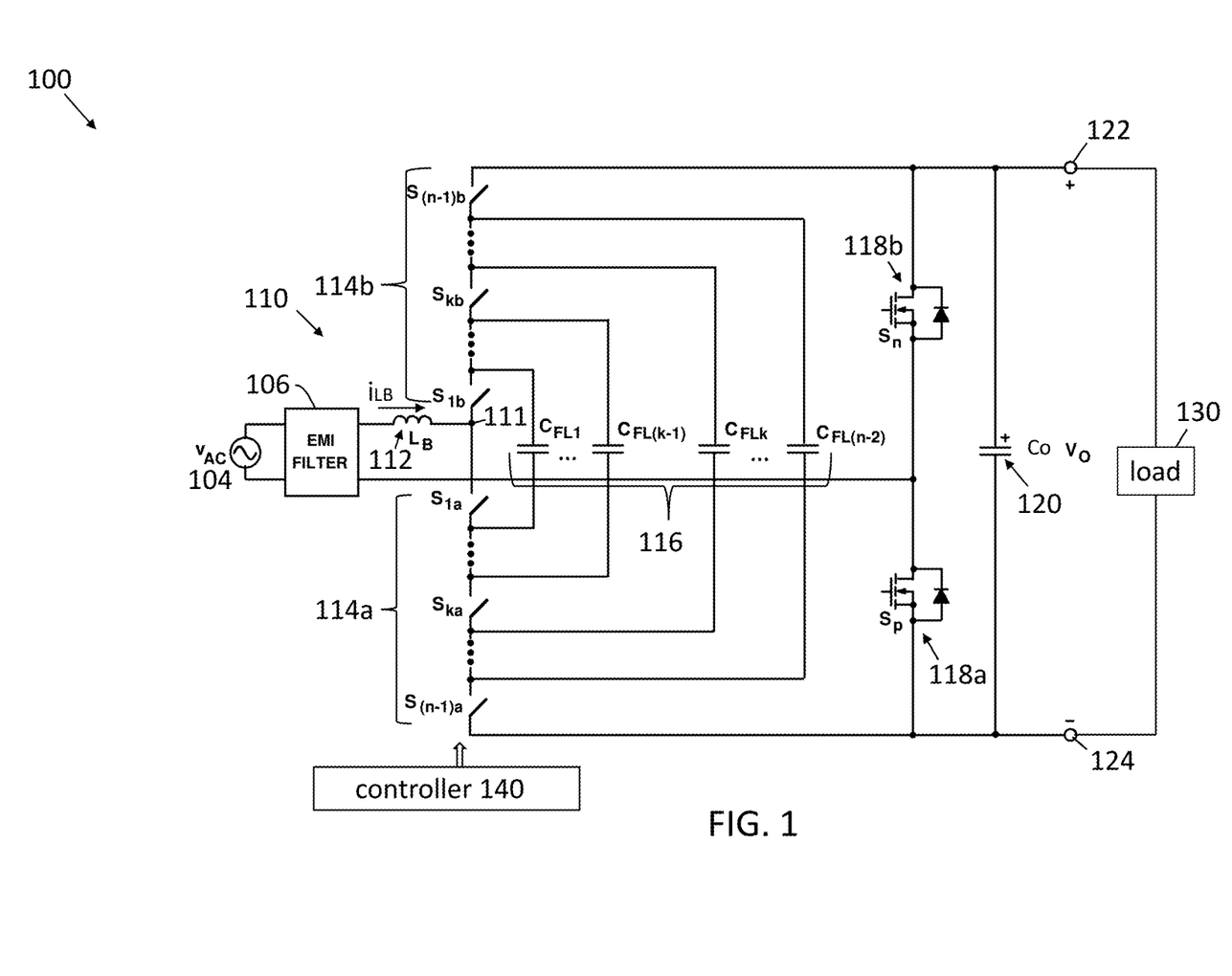
FIG. 1 is a circuit diagram of an n-level flying capacitor multi-level (FCML) power factor correction (PFC) converter of a power supply system that implements active balancing of the voltage of each of the flying capacitors according to exemplary embodiments.

FIG. 1 is a circuit diagram of an n-level FCML PFC converter 110 of a power supply 100 that implements active balancing of the voltage of each of the flying capacitors according to exemplary embodiments. An AC input 104 may be supplied by the grid, for example. The exemplary PFC converter 110 is shown to include an electromagnetic interference (EMI) filter 106 that suppresses electromagnetic noise transmitted through the wiring. A boost inductor 112 ($L_B$) is electrically connected to the AC input 104 and has a current $i_{L_B}$ flowing therethrough, as indicated. A terminal 111 of the boost inductor 112 is electrically connected to a totem-pole arrangement of a first set of switches 114a ($S_{1a}$ through $S_{(n-1)a}$) and a second set of switches 114b ($S_{1b}$ through $S_{(n-1)b}$), generally referred to as switches 114.

The first set of switches 114a is connected to the terminal 111 of the boost inductor 112 at one end and to a negative output terminal 124 at the other, opposite, end. The second set of switches 114b is connected to the terminal 111 of the boost inductor 112 at one end and to a positive output terminal 122 at the other, opposite, end. The output voltage $v_o$ may be measured between the positive output terminal 122 and the negative output terminal 124. The first set of switches 114a is arranged from innermost switch $S_{1a}$, which is closest to center of the totem-pole and to boost inductor 112, to outermost switch $S_{(n-1)a}$, which is closest to the negative output terminal 124 Similarly, the second set of switches 114b is arranged from innermost switch Sib to outermost switch $S_{(n-1)b}$. In the embodiment, the first set of switches 114a include three or more switches, $S_{1a}$ through $S_{(n-1)a}$, arranged in series and electrically connected to the terminal 111 of the inductor 112 at one end and to the negative output terminal 124 at an opposite end. The second set of switches 114b includes three or more switches, $S_{1b}$ through $S_{(n-1)b}$, arranged in series and electrically connected to the terminal 111 of the inductor 112 at the one end and to the positive output terminal 122 at an opposite end.

As shown in FIG. 1, flying capacitors 116 ($C_{FL1}$ through $C_{FL(n-2)}$) are arranged from the innermost flying capacitor 116 $C_{FL1}$, which is associated with the innermost switches 114, to the outermost flying capacitor 116 $C_{FL(n-2)}$, which is associated with the outermost switches 114. Specifically, each flying capacitor 116 is connected between adjacent ones of the first set of switches 114a and corresponding adjacent ones of the second set of switches 114b. For example, flying capacitor 116 $C_{FL1}$ is connected between switches $S_{1a}$ and $S_{2a}$, which are adjacent ones of the first set of switches 114a, and switches $S_{1b}$ and $S_{2b}$, which are adjacent ones of the second set of switches 114b. In the embodiment, the FCML PFC converter 110 includes two or more flying capacitors, $C_{FL1}$ through $C_{FL(n-2)}$. Each of the two or more flying capacitors $C_{FLK}$ is connected between different pairs of adjacent ones of the first set of switches 114a and corresponding adjacent ones of the second set of switches 114b.

A positive half line-cycle selection switch 118a ($S_p$) and a negative half line-cycle selection switch 118b ($S_n$), generally referred to as selection switch 118 or unfolder switch, are shown in FIG. 1. Based on the operation of the selection switches 118, the first set of switches 114a function as boost switches while the second set of switches 114b function as synchronous rectifier switches during a positive half line-cycle of the AC input 104, and the second set of switches 114b function as boost switches while the first set of switches 114a function as synchronous rectifier switches during a negative half line-cycle. An output capacitor 120 ($C_o$) is in parallel with one or more loads 130 that are supplied with the output voltage $v_o$. A DC-DC converter may first be used to up or down-convert the output voltage $v_o$ prior to supplying the loads 130.

A controller 140 is indicated in FIG. 1. As previously noted, the controller 140 conventionally controls the duty cycle of the switches 114 to implement power factor correction and to regulate the output voltage $v_o$. According to one or more embodiments, as detailed for the simplified case of a 4-level FCML PFC converter 110 shown in FIGS. 2-4 and as also discussed for the general case of the n-level FCML PFC converter 110 in FIGS. 1 and 5, the controller 140 adjusts the control of the duty cycle of the switches 114 based on active control of the voltage of the flying capacitors 116.

Figure 2:
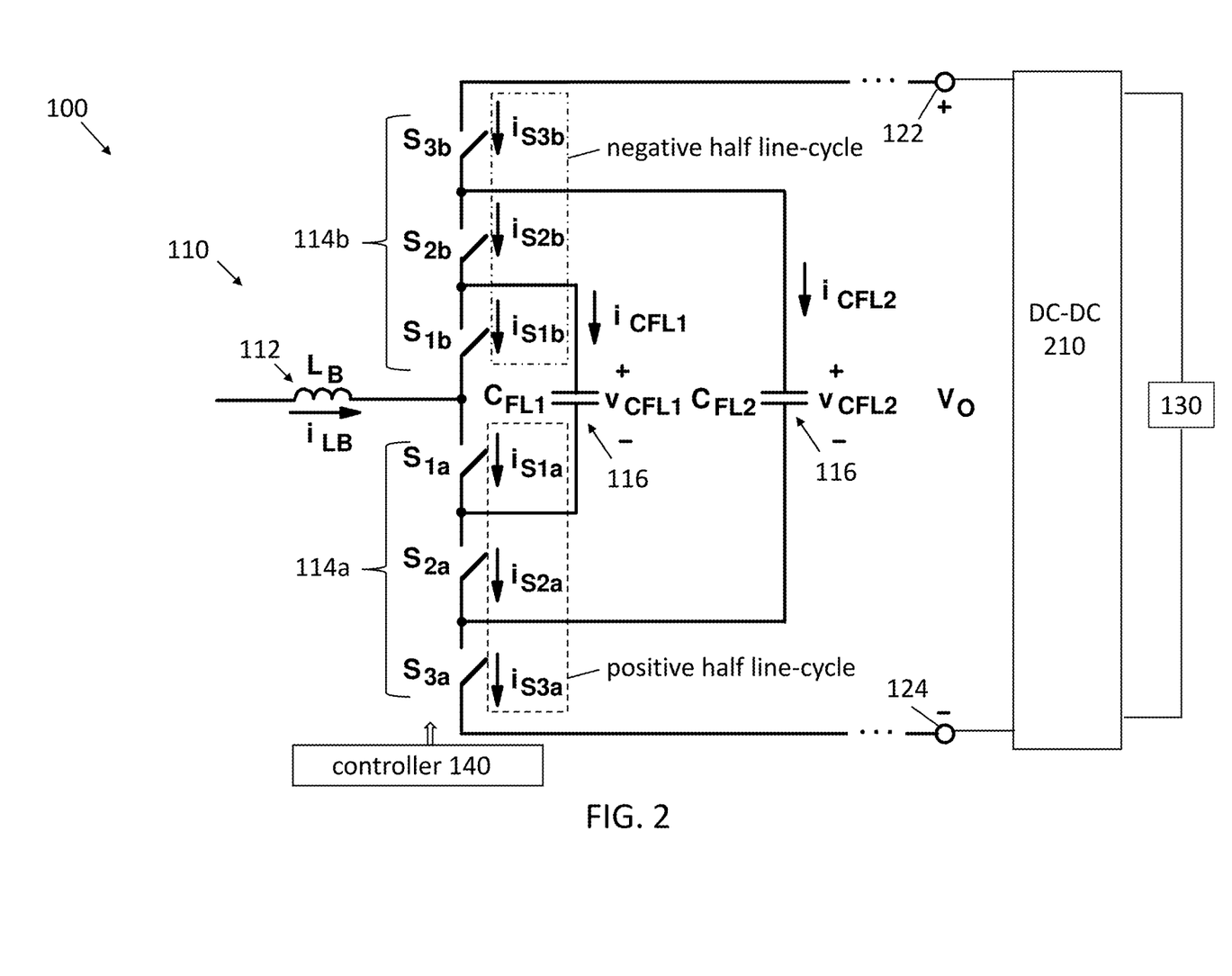
FIG. 2 is a circuit diagram of a 4-level FCML PFC converter of a power supply that implements active balancing of the voltage of each of the flying capacitors according to exemplary embodiments.

FIG. 2 is a circuit diagram of aspects of a 4-level FCML PFC converter 110 of a power supply 100 that implements active balancing of the voltage of each of the flying capacitors according to exemplary embodiments. For readability, the selection switches 118 and their connection to the AC input 104, as shown in FIG. 1, are omitted in FIG. 2. The exemplary power supply 100 is shown to include a DC-DC converter 210 that may, for example, decrease the output voltage $v_o$ of the 4-level FCML PFC converter 110 before supplying a load 130. The 4-level example of the FCML PFC converter 110 of FIG. 2 is used to explain the active balancing that is further discussed with reference to FIG. 3. For the 4-level FCML PFC converter 110 (i.e., with n=4), the n−1 (i.e., 3) first set of switches 114a ($S_{1a}$ through $S_{3a}$) and second set of switches 114b ($S_{1b}$ through $S_{3b}$) are shown, as are the n−2 (i.e., 2) flying capacitors 116 ($C_{FL1}$ and $C_{FL2}$).

As previously noted, during the positive half line-cycle of the AC input 104, the first set of switches 114a act as boost switches. That is, the currents $i_{s1a}$ through $i_{s3a}$ flow during the positive half line-cycle, as indicated, and are equal to the boost inductor current $i_{LB}$. Thus, the currents ($i_{s1a}$, $i_{s2a}$, $i_{s3a}$) through the first set of switches 114a ($S_{1a}$, $S_{2a}$, $S_{3a}$) may be expressed:

$$i_{ska}(t) = d_{ska}(t) \cdot i_{LB}(t), k \in \{1, 2, 3\} \quad [\text{EQ. 1}]$$

In EQ. 1, $d_{ska}(t)=1$ during the conduction interval of switch $S_{ka}$, as controlled by the corresponding selection switch 118, and $d_{ska}(t)=0$ outside the conduction interval during a switching cycle $T_{SW}$. Similarly, during the negative half line-cycle of the AC input 104, the second set of switches 114b act as boost switches and currents $i_{s1b}$ through $i_{s3b}$ flow, as indicated, and are equal to the boost inductor current $i_{LB}$. Thus, the current ($i_{s1b}$, $i_{s2b}$, $i_{s3b}$) through the second set of switches 114b ($S_{1b}$, $S_{2b}$, $S_{3b}$) may be expressed:

$$i_{skb}(t) = d_{skb}(t) \cdot i_{LB}(t), k \in \{1, 2, 3\} \quad [\text{EQ. 2}]$$

In EQ. 2, $d_{skb}(t)=1$ during the conduction interval of switch 114 $S_{kb}$, as controlled by the corresponding selection switch 118, and $d_{skb}(t)=0$ outside the conduction interval during a switching cycle $T_{SW}$. The switches 114 $S_{ka}$ and $S_{kb}$ are operated in a complementary manner such that one is conducting while the other is not.

Based on the arrangement of the flying capacitors 116, during the positive half line-cycle, the currents through the flying capacitors 116, $i_{CLF1}$ and $i_{CLF2}$, are given by:

$$i_{CLF1}(t) = i_{s2a}(t) - i_{s1a}(t) = [d_{s2a}(t) - d_{s1a}(t)]i_{LB}(t) \quad [\text{EQ. 3}]$$

$$i_{CLF2}(t) = i_{s3a}(t) - i_{s2a}(t) = [d_{s3a}(t) - d_{s2a}(t)]i_{LB}(t) \quad [\text{EQ. 4}]$$

During the negative half line-cycle, the currents $i_{CLF1}$ and $i_{CLF2}$ are given by:

$$i_{CLF1}(t) = i_{s2b}(t) - i_{s1b}(t) = [d_{s2b}(t) - d_{s1b}(t)]i_{LB}(t) \quad [\text{EQ. 5}]$$

$$i_{CLF2}(t) = i_{s3b}(t) - i_{s2b}(t) = [d_{s3b}(t) - d_{s2b}(t)]i_{LB}(t) \quad [\text{EQ. 6}]$$

The currents $i_{CLF1}$ and $i_{CLF2}$ of the flying capacitors 116 are used to obtain their respective voltages $v_{CLF1}$ and $v_{CLF2}$.

As discussed with reference to FIG. 3, the controller 140 compares the voltage $v_{CLF1}$ or $v_{CLF2}$ of each flying capacitor 116 with its expected voltage. The expected voltage is proportional to the output voltage $v_o$. That is, the expected voltage of the flying capacitor 116 $C_{FL1}$ is $v_o/3$, while the expected voltage of the flying capacitor 116 $C_{FL2}$ is $2v_o/3$. Generally, for an n-level FCML PFC converter 110, as shown in FIG. 1, the flying capacitors 116 $C_{FLK}$ from $C_{FL1}$ to $C_{FL(n-2)}$ (i.e., k={1, 2, . . . , n−2}) have corresponding expected voltages of $kv_o/(n-1)$. A comparison of the actual voltage with the expected voltage of each of the flying capacitors 116 indicates whether a given flying capacitor 116 must be charged or discharged. This charging or discharging is accomplished via control of the duty cycle of the switches 114, as further detailed.

Figure 3:
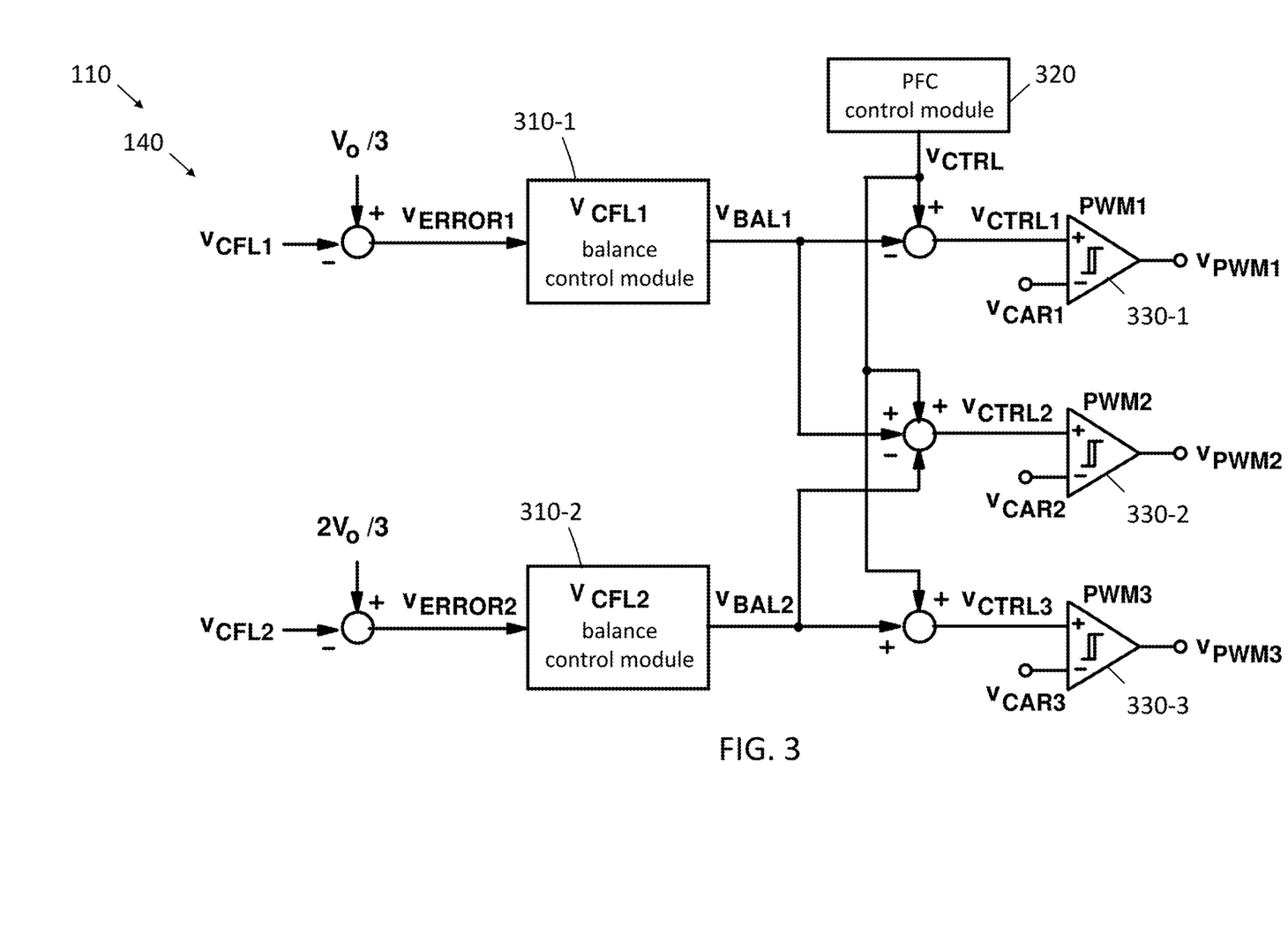
FIG. 3 is a block diagram of aspects of the controller of the FCML PFC converter that implements active balancing of the voltage of each of the flying capacitors of FIG. 2 according to exemplary embodiments.

FIG. 3 is a block diagram of an exemplary embodiment of a controller 140 of an FCML PFC converter 110. The exemplary controller 140 shown in FIG. 3 corresponds with the 4-level FCML PFC converter 110 shown in FIG. 2 and implements active balancing of the voltages $v_{CLF1}$ and $v_{CLF2}$ of the flying capacitors 116 $C_{FL1}$ and $C_{FL2}$. As previously noted, the controller 140 conventionally controls the duty cycle of the switches 114 to implement power factor correction and to regulate the output voltage $v_o$. In the embodiment, the controller 140 includes a PFC control module 320 configured to provide a duty cycle control signal ($V_{CTRL}$) that controls a gate voltage provided to each of the first set of switches 114a and the second set of switches 114b to implement power factor correction and to regulate an output voltage (Vo). The PFC control module 320 that includes voltage and current controllers and provides the conventional control signal VCTRL is known and is not further detailed herein. As shown in FIG. 3 and further detailed, the conventional control signal $V_{CTRL}$ is augmented, according to exemplary embodiments, in order to balance the voltage of each of the flying capacitors. In one embodiment, the controller 140 is configured to obtain an adjusted control signal (VCTRLk) from the duty cycle control signal ($V_{CTRL}$) and the balance adjustment signal ($V_{BALk}$) associated with one or two of the two or more flying capacitors ($C_{FLK}$).

As shown in FIG. 2, the exemplary 4-level FCML PFC converter 110 includes two flying capacitors 116 $C_{FL1}$ and $C_{FL2}$. Each of the flying capacitors 116 $C_{FL1}$ and $C_{FL2}$ is respectively associated with a balance control module 310-1, 310-2, generally referred to as 310. In one embodiment, the controller 140 includes two or more balance control modules 310-1, 310-2, each associated with one of the two or more flying capacitors 116. Generally, for a given flying capacitor 116 $C_{FLK}$, the input to the balance control module 310-k is the error $v_{ERRORk}$ computed as a difference between the expected voltage $kv_o/(n-1)$ and the measured voltage $v_{CFLk}$. Thus, in the exemplary case shown in FIG. 2 (n=4), for each flying capacitor 116 $C_{FLk}$, (k∈{1,2}), the input to the balance control module 310-k (k∈{1,2}) is the error $v_{ERRORk}$ computed as a difference between the expected voltage $kv_o/3$ and the measured voltage $v_{CFLk}$. Thus, the error $v_{ERROR1}$ computed for flying capacitor 116 $C_{FL1}$ is $v_o/3-v_{CFL1}$ and the error $v_{ERROR2}$ computed for flying capacitor 116 $C_{FL2}$ is $2v_o/3-v_{CFL2}$, as indicated in FIG. 3. In the embodiment, each of the balance control modules 310 obtains the error voltage $v_{ERROR}$ and provides a balance adjustment signal $v_{BAL}$ based on the error voltage $v_{ERROR}$.

Each balance control module 310-k may implement, for example, proportional (P) or proportional and integral (PI) control on the input error $v_{ERRORk}$. Known proportional (P) control refers to a type of control in which the output signal, $v_{BALk}$ in this case, shows proportionality with the input error $v_{ERRORk}$. Known integral control (I) refers to a type of control in which the output signal (i.e., $v_{BALk}$) is proportional to the integral of the input error $v_{ERRORk}$. PI control correlates the output signal (i.e., $v_{BALk}$) to the error $v_{ERRORk}$ and the integral of the error $v_{ERRORk}$. As FIG. 3 shows, each of the balance control modules 310-1 and 310-2 associated with each of the flying capacitors 116 $C_{FL1}$ and $C_{FL2}$ provides a respective output signal $v_{BAL1}$ and $v_{BAL2}$. More generally, each balance control module 310-k associated with each flying capacitor 116 $C_{FLk}$ provides an output signal $v_{BALk}$. In one embodiment, each of the two or more balance control modules 310 implements a proportional control or a proportional and integral control on the error voltage $v_{ERROR}$ to provide the balance adjustment signal $v_{BAL}$.

Three pulse width modulators 330-1, 330-2, 330-3, generally referred to as 330, are shown in FIG. 3 for the exemplary 4-level FCML PFC converter 110. More generally, there are (n-1) pulse width modulators 330 for an n-level FCML PFC converter 110, as shown in FIG. 5. That is, while the number of balance control modules 310 is equal to the number of flying capacitors 116 (i.e., n-2 for an n-level FCML PFC converter 110), the number of pulse width modulators 330 is equal to the number of the first set of switches 114a or the second set of switches 114b (i.e., n-1). As detailed with reference to FIG. 4, the output of each given pulse width modulator 330k is used to obtain the gate drive voltages $v_{GSka}$ and $v_{GSkb}$ for the corresponding switches 114 $S_{ka}$ and $S_{kb}$ among both the first set of switches 114a and the second set of switches 114b. In one embodiment, the controller 140 is configured to compute the error voltage $v_{ERROR}$ provided to each of the two or more balance control modules 310 by using the measurement of the output voltage (Vo) and a voltage of the one of the two or more flying capacitors 116 associated with the balance control module 310.

As FIG. 3 indicates, the controller 140 subtracts the output signal $v_{BAL1}$ provided by the balance control module 310-1 from the conventional control signal VCTRL of the PFC control module 320 to provide the control signal $v_{CTRL1}$ to the pulse width modulator 330-1. The pulse width modulator 330-1 modulates the carrier signal $v_{CAR1}$ with the control signal $v_{CTRL1}$ to provide the pulse width modulated signal $v_{PWM1}$. In the embodiment, the carrier signal $v_{CAR1}$ is in the form of voltage, and it may also be considered as a carrier voltage signal. As discussed with reference to FIG. 4, each pulse width modulated signal $v_{PWMk}$ is used to generate two gate drive voltages $v_{GSka}$ and $v_{GSkb}$. That is, the pulse width modulated signal $v_{PWM1}$ is used to obtain the gate drive voltages $v_{GS1a}$ and $v_{GS1b}$ that respectively control opening and closing of the switches Sla and Sib. In one embodiment, the pulse width modulated signal $v_{PWMk}$ is in the form of voltage, and it may also be considered as pulse width modulated voltage.

The controller 140 adds the output signal $v_{BAL2}$ provided by the balance control module 310-2 to the conventional control signal $v_{CTRL}$ to provide the control signal $v_{CTRL3}$ to the pulse width modulator 330-3. The pulse width modulator 330-3 modulates the carrier signal $v_{CAR3}$ with the control signal $v_{CTRL3}$ to provide the pulse width modulated signal $v_{PWM3}$. In the embodiment, the carrier signal $v_{CAR3}$ is in the form of voltage, and it may also be considered as a carrier voltage signal. The carrier signal $v_{CAR3}$ is phase shifted by 240 degrees relative to the carrier signal $v_{CAR1}$. The pulse width modulated signal $v_{PWM3}$ is used to obtain the gate drive voltages $v_{GS3a}$ and $v_{GS3b}$ that respectively control opening and closing of the switches $S_{3a}$ and $S_{3b}$. In one embodiment, the pulse width modulated signal $v_{PWM3}$ is in the form of voltage, and it may also be considered as pulse width modulated voltage.

The controller 140 adds the output signal $v_{BAL1}$ provided by the balance control module 310-1 to the conventional control signal VCTRL and subtracts the output signal $v_{BAL2}$ provided by the balance control module 310-2 from the conventional control signal $v_{CTRL}$ to provide the control signal $v_{CTRL2}$ to the pulse width modulator 330-2. The pulse width modulator 330-2 modulates the carrier signal $v_{CAR2}$ with the control signal $v_{CTRL2}$ to provide the pulse width modulated signal $v_{PWM2}$. In the embodiment, the carrier signal $v_{CAR2}$ is in the form of voltage, and it may also be considered as a carrier voltage signal. The carrier signal $v_{CAR2}$ is phase shifted by 120 degrees relative to the carrier signal $v_{CAR1}$. The pulse width modulated signal $v_{PWM2}$ is used to obtain the gate drive voltages $v_{GS2a}$ and $v_{GS2b}$ that respectively control opening and closing of the switches $S_{2a}$ and $S_{2b}$. The more general case of an n-level FCML PFC converter 110 is discussed with reference to FIG. 5. In one embodiment, the pulse width modulated signal $v_{PWM2}$ is in the form of voltage, and it may also be considered as pulse width modulated voltage. In the embodiment, the controller 140 is configured to obtain a pulse width modulated voltage from the adjusted control signal and a carrier voltage signal for the pair of switches. Further, the controller 140 is configured to obtain the gate voltage used to operate the one switch from the first set of switches 114a and the one switch from the second set of switches 114b from the pulse width modulated voltage for the pair of switches.

Figure 4:
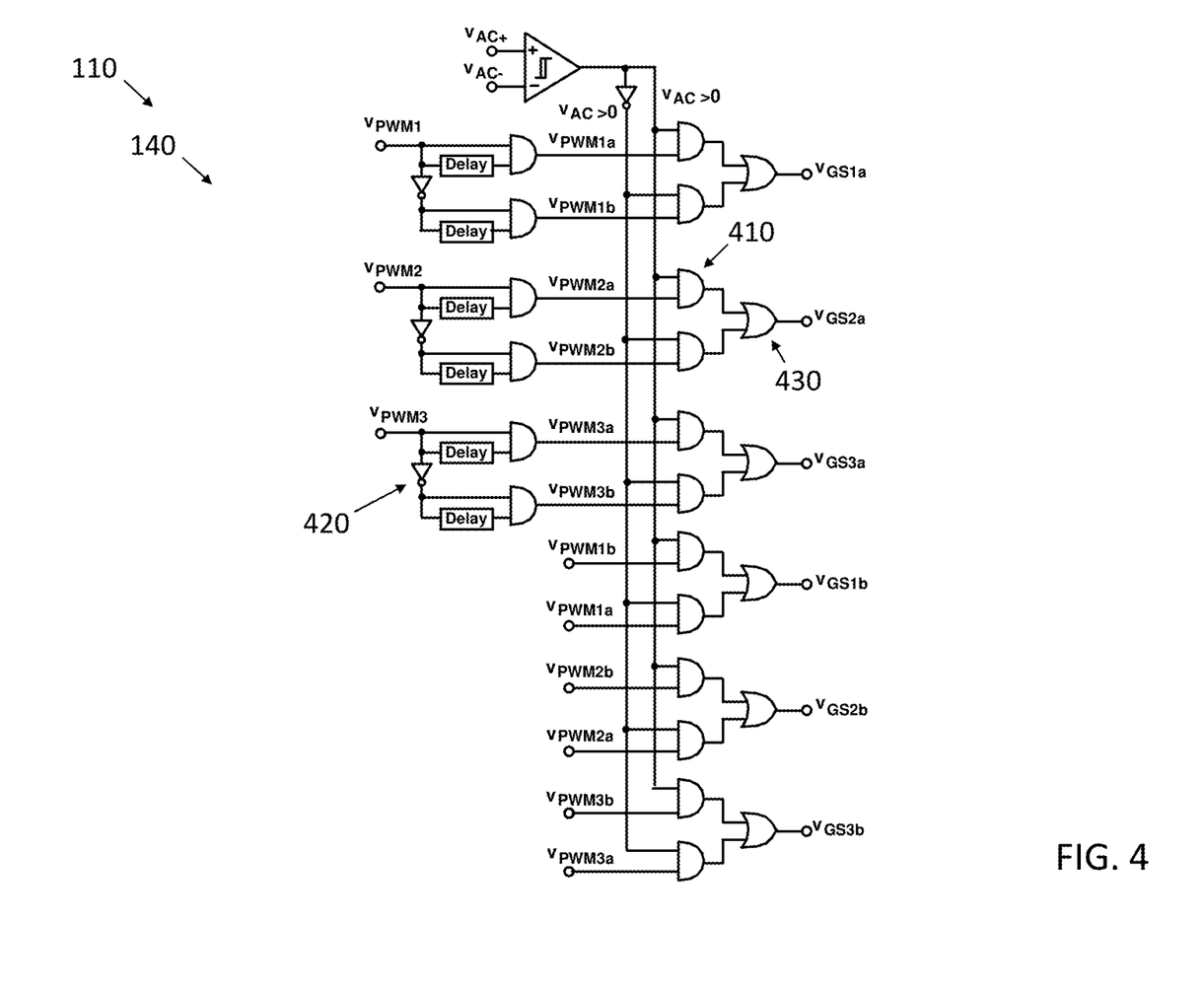
FIG. 4 is a circuit diagram of gate voltage generators that are part of the controller of the FCML PFC converter of FIG. 2.
Figure 5:
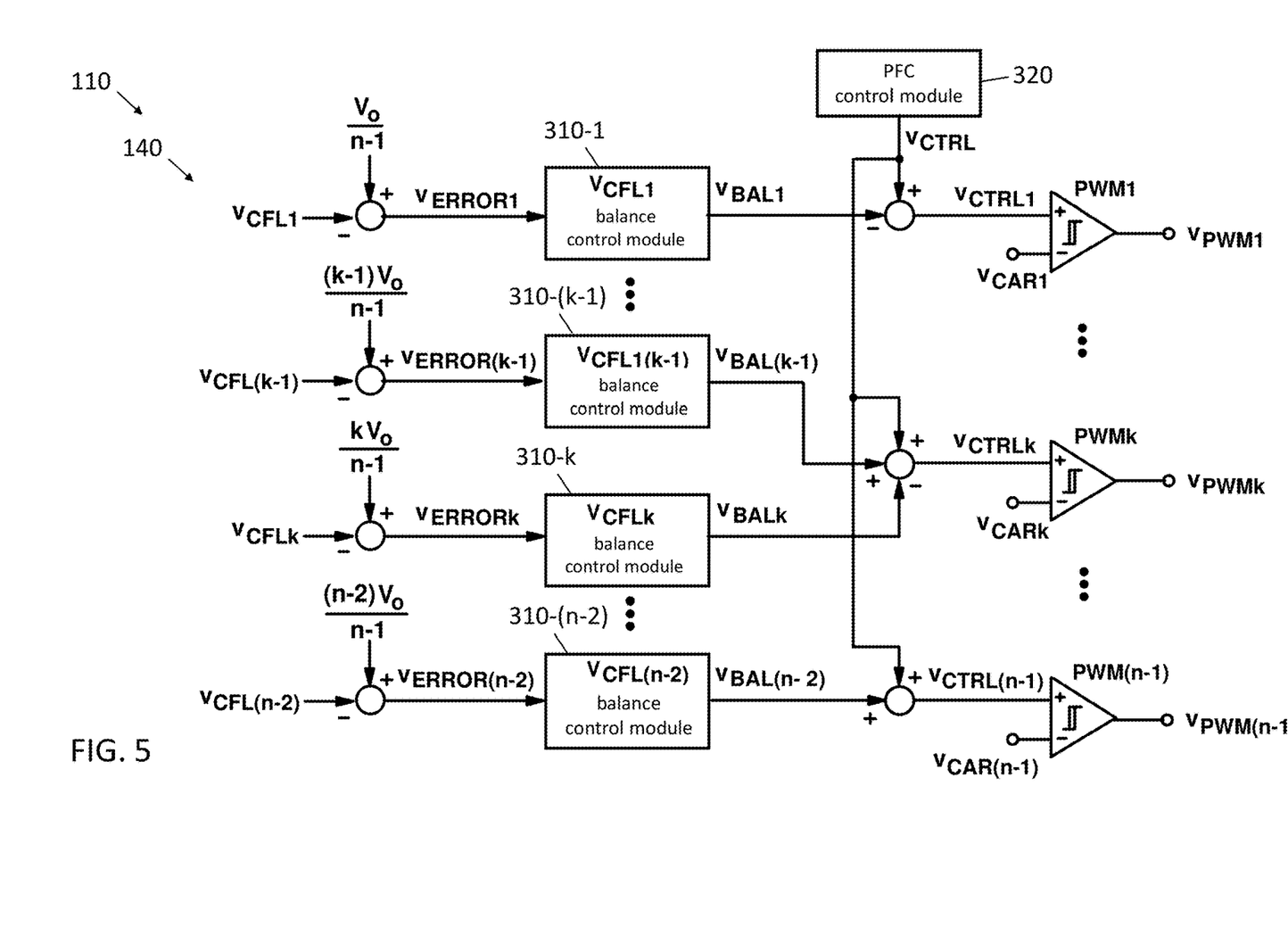
FIG. 5 is a block diagram of a controller for the n-level FCML PFC converter shown in FIG. 1.

FIG. 4 is a circuit diagram of a gate voltage generation portion of the controller 140 of the FCML PFC converter 110. For readability, every logic gate is not labeled. Instead, like symbols are used for each AND gate 410, each inverter 420 (i.e., NOT) and each OR gate 430. As illustrated, each pulse width modulated signal $v_{PWMk}$ is used to generate two complementary gate drive voltages $v_{GSka}$ and $v_{GSkb}$ that are provided to the two switches $S_{ka}$ and $S_{kb}$ of a complementary pair. Each pulse width modulated signal $v_{PWMk}$ is used to generate an inverted version that is the complement of the pulse width modulated signal $v_{PWMk}$. The delay indicated in FIG. 4 is used to achieve a dead time control between the complementary switches 114. The polarity of the line voltage $v_{AC}$ controls the distribution of the complementary pulse width modulated signals $v_{PWMka}$ and $v_{PWMk}b$ to generate the two complementary gate drive voltages $v_{GSka}$ and $v_{GSkb}$ resulting from each pulse width modulated signal $v_{PWMk}$.

FIG. 5 is a block diagram of a controller 140 for the n-level FCML PFC converter 110 shown in FIG. 1. The n-level FCML PFC converter 110 includes (n-1) first set of switches 114a. (n-1) second set of switches 114b, and (n-2)

flying capacitors 116. As discussed with reference to FIG. 3, each of the flying capacitors 116 is associated with a balance control module 310. As also discussed, the output signal $v_{BALk}$ from one or two of the balance control modules 310 may be used to obtain the pulse width modulated signal $v_{PWMk}$ that provides the gate drive voltages $v_{GSka}$ and $v_{GSkb}$ for a complementary pair of switches 114. The carrier signal $v_{CARk}$ is phase shifted by (k−1)360/(n−2) degrees relative to the carrier signal $v_{CAR1}$.

That is, as discussed with reference to FIG. 3 and detailed below, the gate drive voltages $v_{GS1a}$ and $v_{GS1b}$ for the complementary pair of innermost switches 114 $S_{1a}$ and $S_{1b}$ and the gate drive voltages $v_{GS(n-1)a}$ and $v_{GS(n-1)b}$ for the complementary pair of outermost switches 114 $S_{(n-1)a}$ and $S_{(n-1)b}$ require only the output signal $v_{BAL1}$ associated with the innermost flying capacitor $C_{FL1}$ and the output signal $v_{BAL(n-2)}$ from the outermost flying capacitor 116 $C_{FL(n-2)}$, respectively. For all intermediate switches 114, between the innermost switches 114 $S_{1a}$ and $S_{1b}$ and the outermost switches 114 $S_{(n-1)a}$ and $S_{(n-1)b}$, the gate drive voltages $v_{GSka}$ and $v_{GSkb}$ require outputs from two of the corresponding balance control modules 310.

More particularly, for the two innermost switches Sla and Sib, the pulse width modulated signal $v_{PWM1}$ that is used to obtain the gate drive voltages $v_{GS1a}$ and $v_{GS1b}$ that respectively control the duty cycle of the two innermost switches $S_{1a}$ and $S_{1b}$ is adjusted by the balance control module 310-1 of the innermost flying capacitor 116 $C_{FL1}$. The adjustment is negatively proportional to the error voltage (i.e., input error $v_{ERROR1}$) of the innermost flying capacitor 116 $C_{FL1}$ (i.e., $v_{BAL1}$ is subtracted from VCTRL).

For the two outermost switches 114 $S_{(n-1)a}$ and $S_{(n-1)b}$, the pulse width modulated signal $v_{PWM(n-1)}$ that is used to obtain the gate drive voltages $v_{GS(n-1)a}$ and $v_{GS(n-1b}$ that respectively control the duty cycle of the two outermost switches 114 $S_{(n-1)a}$ and $S_{(n-1)b}$ is adjusted by the balance control module 310-(n−2) of the outermost flying capacitor 116 $C_{FL(n-2)}$. The adjustment is positively proportional to the error voltage (i.e., input error $v_{ERROR(n-2)}$) of the outermost flying capacitor 116 $C_{FL(n-2)}$ (i.e., $v_{BAL(n-2)}$ is added to $v_{CTRL}$).

For each pair of intermediate switches 114 $S_{ka}$ and $S_{kb}$ that is between the pair of innermost switches 114 $S_{1a}$ and $S_{1b}$ and the pair of outermost switches 114 $S_{(n-1)a}$ and $S_{(n-1)b}$, the pulse width modulated signal $v_{PWMk}$ that is used to obtain the gate drive voltages $v_{GSka}$ and $v_{GSkb}$ that respectively control the duty cycle of the pair of switches 114 $S_{ka}$ and $S_{kb}$ is adjusted by both the balance control module 310-(k−1) of the innermost flying capacitor 116 $C_{FL(k-1)}$ associated with the pair of switches 114 $S_{ka}$ and $S_{kb}$ and the balance control module 310-k of the outermost flying capacitor 116 $C_{FLK}$ associated with the pair of switches 114 $S_{ka}$ and $S_{kb}$. The adjustment is positively proportional to the error voltage provided by the balance control module 310-(k−1) of the innermost flying capacitor 116 $C_{FL(k-1)}$ associated with the pair of switches 114 $S_{ka}$ and $S_{kb}$ and is negatively proportional to the error voltage provided by the balance control module 310-k of the outermost flying capacitor 116 $C_{FLK}$ associated with the pair of switches 114 $S_{ka}$ and $S_{kb}$.

That is, the output of one balance control module 310-(k−1) is added while the output of the other balance control module 310-k is subtracted, as per the discussion for switches $S_{2a}$ and $S_{2b}$ with reference to FIG. 3. While not shown for the n-level FCML PFC converter 110, a gate voltage generation portion of the controller 140, analogous to the one shown in FIG. 4 for the 4-level FCML PFC converter 110 of FIG. 2, generates the gate drive voltages for each of the switches 114 of the n-level FCML PFC converter 110.

Figure 6:
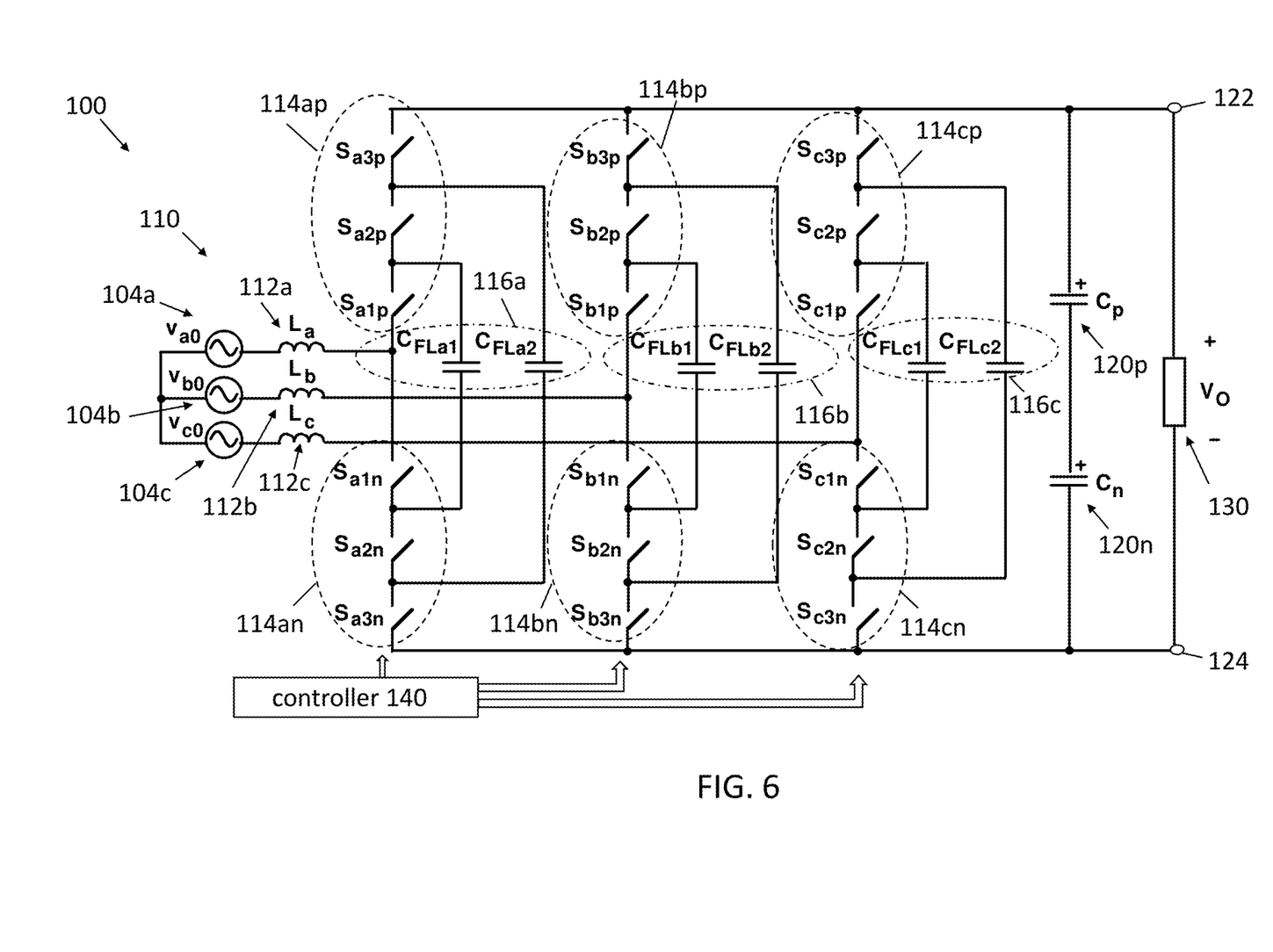
FIG. 6 is a circuit diagram of a 3-phase 4-level FCML PFC converter of a power supply that implements active balancing of the voltage of each of the flying capacitors according to exemplary embodiments.

FIG. 6 is a circuit diagram of a 3-phase 4-level FCML PFC converter 110 of a power supply system 100 that implements active balancing of the voltage of each of the flying capacitors according to exemplary embodiments. The three phases a, b, c of AC inputs 104a, 104b, 104c, generally AC input 104, are indicated. Each is electrically connected with a boost inductor 112a, 112b, 112c, generally boost inductor 112. Each boost inductor 112 is electrically connected to a different totem-pole arrangement of switches 114. Specifically, boost inductor 112a is connected to a first set of switches 114ap $S_{a1p}$, $S_{a2p}$, $S_{a3p}$ and a second set of switches 114an $S_{a1n}$, $S_{a2n}$, $S_{a3n}$, boost inductor 112b is connected to a first set of switches 114bp $S_{b1p}$, $S_{b2p}$, $S_{b3p}$ and a second set of switches 114bn $S_{b1n}$, $S_{b2n}$, $S_{b3n}$, and boost inductor 112c is connected to a first set of switches 114cp $S_{c1p}$, $S_{c2p}$, $S_{c3p}$ and a second set of switches 114cn $S_{c1n}$, $S_{c2n}$, $S_{c3n}$.

Each of the first set of switches 114ap, 114bp, 114cp and the second set of switches 114an, 114bn, 114cn is respectively associated with two flying capacitors 116a ($C_{FLa1}$ and $C_{FLa2}$), 116b ($C_{FLb1}$ and $C_{FLb2}$), 116c ($C_{FLc1}$ and $C_{FLc2}$). Output capacitors 120p, 120n (Cp, Cn) are in parallel with one or more loads 130 that are supplied with the output voltage $v_o$ that may be measured between the positive output terminal 122 and the negative output terminal 124. An EMI filter 106, and an optional DC-DC converter are not shown in FIG. 6 but may be present.

A controller 140 is shown and augments control of the duty cycle of each of the switches 114 to balance each pair of flying capacitors 116a, 116b, 116c as previously detailed. The implementation of the control previously detailed for the controller 140 may be implemented in two or more controllers 140 rather than in one controller 140, as shown. Regardless of the arrangement among one or more controllers 140, each of the flying capacitors 116 associated with each of the phases would have a corresponding balance control module 310. Each of the one or more controllers 140 may include one or more processors and memory to implement the logic and functions discussed herein. The memory may include a non-transitory computer readable medium that stores instructions that may be processed by one or more processors to implement the functions detailed herein.

According to above mentioned, one embodiment of the present disclosure provides a method of assembling a power factor correction (PFC) converter. The method includes arranging an inductor to electrically connect to an alternating current (AC) source, arranging a first set of switches, including three or more switches, in series, wherein the first set of switches is electrically connected to a terminal of the inductor at one end and to a negative output terminal at an opposite end, and arranging a second set of switches, including three or more switches, in series. The second set of switches is electrically connected to the terminal of the inductor at one end and to a positive output terminal at an opposite end, and an output voltage of the PFC converter is between the positive output terminal and the negative output terminal. The method also includes arranging two or more flying capacitors such that each of the two or more flying capacitors is connected between different pairs of adjacent ones of the first set of switches and corresponding adjacent ones of the second set of switches, and configuring a controller to control a duty cycle of the first set of switches and the second set of switches based on balancing voltages of the two or more flying capacitors.

In one embodiment, each of the two or more flying capacitors is associated with a balance control module of the controller, and the configuring the controller includes the controller obtaining a duty cycle control signal configured to control a gate voltage provided to each of the first set of switches and the second set of switches to implement power factor correction and to regulate an output voltage and modify the duty cycle control signal based on an output from one or more balance control modules.

Although explanatory embodiments have been described, other embodiments are possible. Therefore, the spirit and scope of the claims should not be limited to the description of the exemplary embodiments. Various modifications and variations can be made without departing from the scope and principle of the present disclosure.

What is claimed is:

1. A power factor correction (PFC) converter comprising:
   an inductor configured to electrically connect to an alternating current (AC) source;
   a first set of switches, comprising three or more switches arranged in series, configured to be electrically connected to a terminal of the inductor at one end and to a negative output terminal at an opposite end;
   a second set of switches, comprising three or more switches arranged in series, configured to be electrically connected to the terminal of the inductor at the one end and to a positive output terminal at an opposite end, wherein an output voltage of the PFC converter is between the positive output terminal and the negative output terminal;
   two or more flying capacitors, wherein each of the two or more flying capacitors is connected between different pairs of adjacent ones of the first set of switches and corresponding adjacent ones of the second set of switches; and
   a controller configured to control a duty cycle of the first set of switches and the second set of switches based on balancing voltages of the two or more flying capacitors;
   wherein:
   the controller comprises two or more balance control modules, each associated with one of the two or more flying capacitors,
   the controller is configured such that each of the two or more balance control modules obtains an error voltage and provides a balance adjustment signal based on the error voltage, and
   the controller is configured to compute the error voltage provided to each balance control module of the two or more balance control modules by using the measurement of the output voltage and a voltage of the one of the two or more flying capacitors associated with the balance control module.

2. The PFC converter according to claim 1, wherein the controller comprises a PFC control module configured to provide a duty cycle control signal that controls a gate voltage provided to each of the first set of switches and the second set of switches to implement power factor correction and to regulate an output voltage.

3. The PFC converter according to claim 1, further comprising a line voltage unfolder circuit comprising of two switches configured to be electrically connected to a neutral terminal of the AC source and to the positive and negative output terminals.

4. The PFC converter according to claim 1, wherein the PFC converter is a multi-level, bridgeless boost PFC converter.

5. The PFC converter according to claim 1, wherein the controller is configured such that each of the two or more balance control modules implements a proportional control or a proportional and integral control on the error voltage to provide the balance adjustment signal.

6. The PFC converter according to claim 1, wherein, for each pair of switches, which comprises one switch from the first set of switches and one switch from the second set of switches, the controller is configured to obtain an adjusted control signal from the duty cycle control signal and the balance adjustment signal associated with one or two of the two or more flying capacitors.

7. The PFC converter according to claim 6, wherein the controller is configured to obtain a pulse width modulated voltage from the adjusted control signal and a carrier voltage signal for the pair of switches.

8. The PFC converter according to claim 7, wherein the controller is configured to obtain the gate voltage used to operate the one switch from the first set of switches and the one switch from the second set of switches from the pulse width modulated voltage for the pair of switches.

9. The PFC converter according to claim 6, wherein:
   the adjusted control signal for a pair of the most inner switches, connected to a most inner flying capacitor and to a terminal of the inductor, is obtained by subtracting the balance adjustment signal associated with the most inner flying capacitor from the duty cycle control signal;
   the adjusted control signal for a pair of the most outer switches, connected to a most outer flying capacitor and to the positive and negative output terminals, is obtained by adding the balance adjustment signal associated with the most outer flying capacitor to the duty cycle control signal;
   the adjusted control signal for a pair of intermediate switches, connected to two intermediate flying capacitors, one intermediate inner and one intermediate outer flying capacitor, is obtained by subtracting the balance adjustment signal associated with the intermediate outer flying capacitor and adding the balance adjustment signal associated with the intermediate inner flying capacitor to the duty cycle control signal.

10. A power supply comprising:
    a power factor correction (PFC) converter comprising:
    an inductor configured to electrically connect to an alternating current (AC) source;
    a first set of switches, comprising three or more switches arranged in series, configured to be electrically connected to a terminal of the inductor at one end and to a negative output terminal at an opposite end;
    a second set of switches, comprising three or more switches arranged in series, configured to be electrically connected to the terminal of the inductor at one end and to a positive output terminal at an opposite end, wherein an output voltage of the PFC converter is between the positive output terminal and the negative output terminal;
    two or more flying capacitors, wherein each of the two or more flying capacitors is connected between different pairs of adjacent ones of the first set of switches and corresponding adjacent ones of the second set of switches; and
    a controller configured to control a duty cycle of the first set of switches and the second set of switches based on balancing voltages of the two or more flying capacitors; and a direct current (DC)-DC converter configured to modify the output voltage prior to supplying a load of the power supply;

wherein:

the controller comprises two or more balance control modules, each associated with one of the two or more flying capacitors, the controller is configured such that each of the two or more balance control modules obtains an error voltage and provides a balance adjustment signal based on the error voltage, and the controller is configured to compute the error voltage provided to each balance control module of the two or more balance control modules by using the measurement of the output voltage and a voltage of the one of the two or more flying capacitors associated with the balance control module.

11. The power supply according to claim 10, wherein the controller comprises a PFC control module configured to provide a duty cycle control signal that controls a gate voltage provided to each of the first set of switches and the second set of switches to implement power factor correction and to regulate an output voltage.

12. The power supply according to claim 10, wherein the PFC converter further comprises a line voltage unfolder circuit comprising of two switches configured to be electrically connected to a neutral terminal of the AC source and to the positive and negative output terminals.

13. The power supply according to claim 10, wherein the PFC converter is a multi-level, bridgeless boost PFC converter.

14. The power supply according to claim 10, wherein the controller is configured such that each of the two or more balance control modules implements a proportional control or a proportional and integral control on the error voltage to provide the balance adjustment signal.

15. The power supply according to claim 10, wherein, for each pair of switches, which comprises one switch from the first set of switches and one switch from the second set of switches, the controller is configured to obtain an adjusted control signal from the duty cycle control signal and the balance adjustment signal associated with one or two of the two or more flying capacitors.

16. The power supply according to claim 15, wherein:

the adjusted control signal for a pair of the most inner switches, connected to a most inner flying capacitor and to a terminal of the inductor, is obtained by subtracting the balance adjustment signal associated with the most inner flying capacitor from the duty cycle control signal;

the adjusted control signal for a pair of the most outer switches, connected to a most outer flying capacitor and to the positive and negative output terminals, is obtained by adding the balance adjustment signal associated with the most outer flying capacitor to the duty cycle control signal;

the adjusted control signal for a pair of intermediate switches, connected to two intermediate flying capacitors, one intermediate inner and one intermediate outer flying capacitor, is obtained by subtracting the balance adjustment signal associated with the intermediate outer flying capacitor and adding the balance adjustment signal associated with the intermediate inner flying capacitor to the duty cycle control signal.

17. The power supply according to claim 15, wherein the controller is configured to obtain a pulse width modulated voltage from the adjusted control signal and a carrier voltage signal for the pair of switches, and the controller is configured to obtain the gate voltage used to operate the one switch from the first set of switches and the one switch from the second set of switches from the pulse width modulated voltage for the pair of switches.

18. The power supply according to claim 10, wherein the AC source comprises a three-phase source, and the power supply comprises three of the PFC converters.

19. A method of assembling a power factor correction (PFC) converter, the method comprising:

arranging an inductor to electrically connect to an alternating current (AC) source;

arranging a first set of switches, comprising three or more switches, in series, wherein the first set of switches is electrically connected to a terminal of the inductor at one end and to a negative output terminal at an opposite end;

arranging a second set of switches, comprising three or more switches, in series, wherein the second set of switches is electrically connected to the terminal of the inductor at one end and to a positive output terminal at an opposite end, and an output voltage of the PFC converter is between the positive output terminal and the negative output terminal;

arranging two or more flying capacitors such that each of the two or more flying capacitors is connected between different pairs of adjacent ones of the first set of switches and corresponding adjacent ones of the second set of switches; and configuring a controller to control a duty cycle of the first set of switches and the second set of switches based on balancing voltages of the two or more flying capacitors;

wherein:

the controller comprises two or more balance control modules, each associated with one of the two or more flying capacitors, the controller is configured such that each of the two or more balance control modules obtains an error voltage and provides a balance adjustment signal based on the error voltage, and the controller is configured to compute the error voltage provided to each balance control module of the two or more balance control modules by using the measurement of the output voltage and a voltage of the one of the two or more flying capacitors associated with the balance control module.

20. The method according to claim 19, wherein each of the two or more flying capacitors is associated with a balance control module of the controller, and the configuring the controller comprises the controller obtaining a duty cycle control signal configured to control a gate voltage provided to each of the first set of switches and the second set of switches to implement power factor correction and to regulate an output voltage and modify the duty cycle control signal based on an output from one or more balance control modules.

* * * * *